United States Patent
Long

(10) Patent No.: US 6,972,913 B2
(45) Date of Patent: Dec. 6, 2005

(54) TWO AXIS TIP-TILT PLATFORM

(75) Inventor: Michael Long, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/769,255

(22) Filed: Jan. 29, 2004

(65) Prior Publication Data

US 2005/0168842 A1    Aug. 4, 2005

(51) Int. Cl.⁷ .......................... G02B 26/08; G02F 26/00
(52) U.S. Cl. ...................... 359/811; 359/224; 359/290; 359/201
(58) Field of Search .................. 359/811, 224, 290, 359/291, 292, 295, 298, 201, 202, 203, 212, 359/213, 214

(56) References Cited

U.S. PATENT DOCUMENTS

| | | | |
|---|---|---|---|
| 4,057,331 A | 11/1977 | Ong et al. | 359/224 |
| 5,748,172 A | 5/1998 | Song et al. | 345/111 |
| 5,986,827 A | 11/1999 | Hale | 359/822 |
| 6,147,818 A | 11/2000 | Hale et al. | 359/819 |
| 6,388,789 B1 * | 5/2002 | Bernstein | 359/198 |
| 6,775,043 B1 * | 8/2004 | Leung et al. | 359/224 |
| 6,808,271 B1 * | 10/2004 | Kurematsu | 353/70 |

FOREIGN PATENT DOCUMENTS

EP    EP 1207416    5/2002

* cited by examiner

Primary Examiner—Timothy Thompson

(57) ABSTRACT

A light direction assembly includes a tip-tilt platform having a first and second axes and having a light direction member coupled thereto, first and second current coils coupled to the platform, and a plurality of pole stand assemblies coupled to the first and second current coils and including a plurality of magnets wherein the magnets are configured to selectively tilt the tip-tilt platform with respect first and second axes in response to first and second currents flowing through the first and second current coils.

37 Claims, 9 Drawing Sheets

TWO AXIS TIP-TILT PLATFORM

BACKGROUND

Light direction assemblies, such as tip-tilt platforms, are used to direct light in several applications, such as digital projectors. The tip-tilt platforms are rotated or moved to direct light. The light directed by the light direction assemblies can either be reflective or refractive. In the case of a reflective tip-tilt platform, a light directing member, such as a mirror, reflects substantially all the light that is incident thereon. Other light directing members control the position of the projected image by diffracting light that passes therethrough.

Accordingly, the position of a projected image can be controlled by controlling the movement of a tip-tilt platform. Some systems make use of several devices to control this motion. For example, several systems make use of three, four, or even more devices to control the motion of a tip-tilt platform. These devices may include piezo-electric actuators, magneto-restrictive devices, capacitor devices and/or voice coils.

In some of these systems, a single device is used to control the position of each corner of the tip-tilt platform that is to be controlled. Each of these actuators adds expense and complication to the control system.

SUMMARY

A light direction assembly includes a tip-tilt platform having a first and second axes and having a light direction member coupled thereto, first and second current coils coupled to the platform, and a plurality of pole stand assemblies coupled to the first and second current coils and including a plurality of magnets, where the magnets are configured to selectively tilt the tip-tilt platform with respect to first and second axes in response to first and second currents flowing through the first and second current coils.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A light direction assembly includes a tip-tilt platform having a first and second axes and having a light direction member coupled thereto, first and second current coils coupled to the platform, and a plurality of pole stand assemblies coupled to the first and second current coils and including a plurality of magnets, where the magnets are configured to selectively tilt the tip-tilt platform with respect to first and second axes in response to first and second currents flowing through the first and second current coils.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
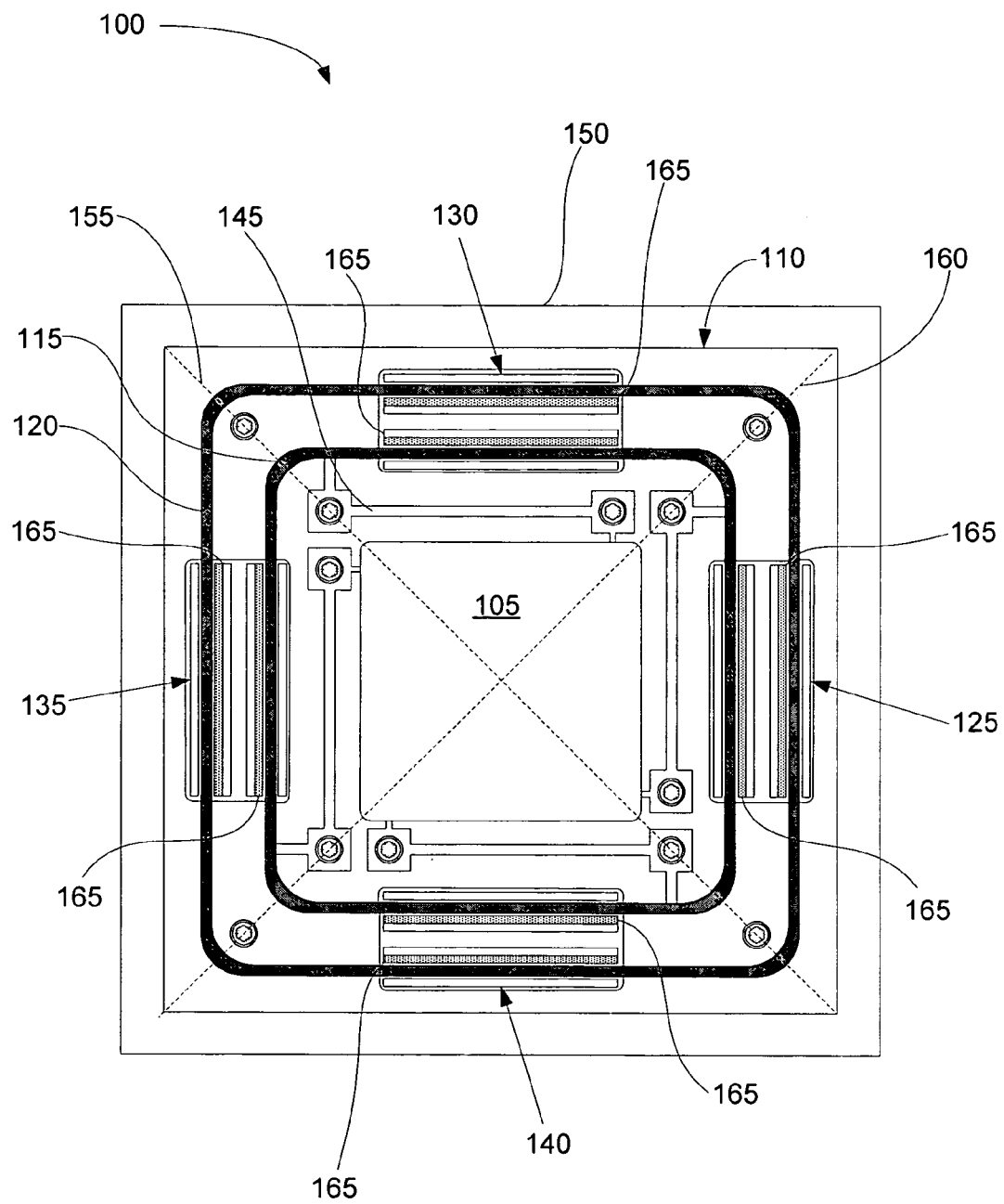
FIG. 1 illustrates a light direction assembly according to one exemplary embodiment.

FIG. 1 illustrates a light direction assembly (100) that generally includes a light directing member (105) coupled to a tip-tilt platform (110), inner and outer current coils (115, 120), first, second, third, and fourth pole stand assemblies (125, 130, 135, 140), biasing springs (145), and a base (150). This configuration allows for control of a light directing member (105) to produce images of improved quality perception while reducing the part count of the light direction assembly (100). The pole stand assemblies (125, 130, 135, 140) are configured such that selectively controlling the current in the inner current coil (115) controls motion about a first axis, and selectively controlling the current in the outer current coil (120) controls motion about a second axis. Consequently, selective and independent application of two currents to the inner and outer current coils (115, 120) controls the motion of the light direction assembly (100). This configuration reduces the part count and complexity, and hence the cost, of the light direction assembly (100).

The light directing member (105) illustrated in FIG. 1 is configured to "steer" or direct light that passes through its surface. For example, the light directing member (105) may be moved such that light entering the light direction assembly (100) from a separate source is directed by the light directing member (105). This direction is possible because, as the light directing member (105) is moved, an incidence angle is formed between the incident light and the light directing member (105).

The physical characteristics of the light directing member (105) cause light that enters with an incidence angle to be refracted slightly. This refraction results in the light being steered or directed as it passes through the light directing member (105). Accordingly, by controlling the movement of the light directing member (105), it is possible to direct the projection of an image. As will be discussed in more detail below, this direction of the projected image allows for enhancement of the image as perceived by a viewer.

The movement of the light directing member (105) is accomplished by controlling the movement of the tip-tilt platform (110) to which the light directing member (105) is secured. The tip-tilt platform (110) acts as a frame for the light directing member (105) and the inner and outer current coils (115, 120).

The tip-tilt platform (110) is rotated or tilted with respect to first and second axes (155, 160). The first and second axes (155, 160) are defined by the diagonals taken across the tip-tilt platform (110). Consequently, an angle is formed by the crossing of the axes (155, 160). In the case of a square tip-tilt platform, the angle formed would be 90 degrees. The 90 degree angle of separation between the two axes (155, 160) indicates that the axes are normal to each other.

As discussed, the tip-tilt platform (110) is selectively rotated or tilted about the first and second axes (155, 160). This movement is accomplished by selectively providing current to the inner current coil (115) and to the outer current coil (120). The current provided to each of the inner and outer current coils (115, 120) may be provided independently of the current provided to the other coil. As a result, the current flowing in the inner coil (115) may have different characteristics than the current flowing in the outer current coil (120). The current flowing in each of the inner and outer current coils (115, 120) flows through magnetic fields in corresponding sections of the pole stand assemblies (125, 130, 135, 140). These magnetic fields are generated by permanent magnets (165). As the current flows past the permanent magnets (165), and hence the magnetic fields, a force is applied to the current coils (115, 120). This force, $F_m$, is characterized by the equation:

$$F_m = IlxB,$$

where I is the current, l is the vector length of the section of wire in the magnetic field, and B is the magnetic field. Accordingly, the force applied to a given section of the current coils (115, 120) depends on the orientation of the permanent magnets (165) in the pole stand assemblies and the characteristics of the current flowing through that section of the current coil. The current characteristics include the magnitude of the current and the direction the current is flowing.

Forces applied to the inner and outer current coils (115, 120) are countered by spring forces. The cantilever springs (145) are attached to the tip-tilt platform (110) and the base (150). As the tip-tilt platform (110) tilts, opposing corners rotate about either the first or second axis (155, 160). As a result, an opposing corner moves away from the base (150) in response to forces applied to the inner and outer current coils (115, 120). This motion deflects the cantilever spring (145). The amount of force applied by the bias spring (145) to oppose the force applied by the inner and outer current coils (115, 120) depends on the distance the bias spring is deflected and the spring constant of the material of the bias spring (145).

Figure 2A:
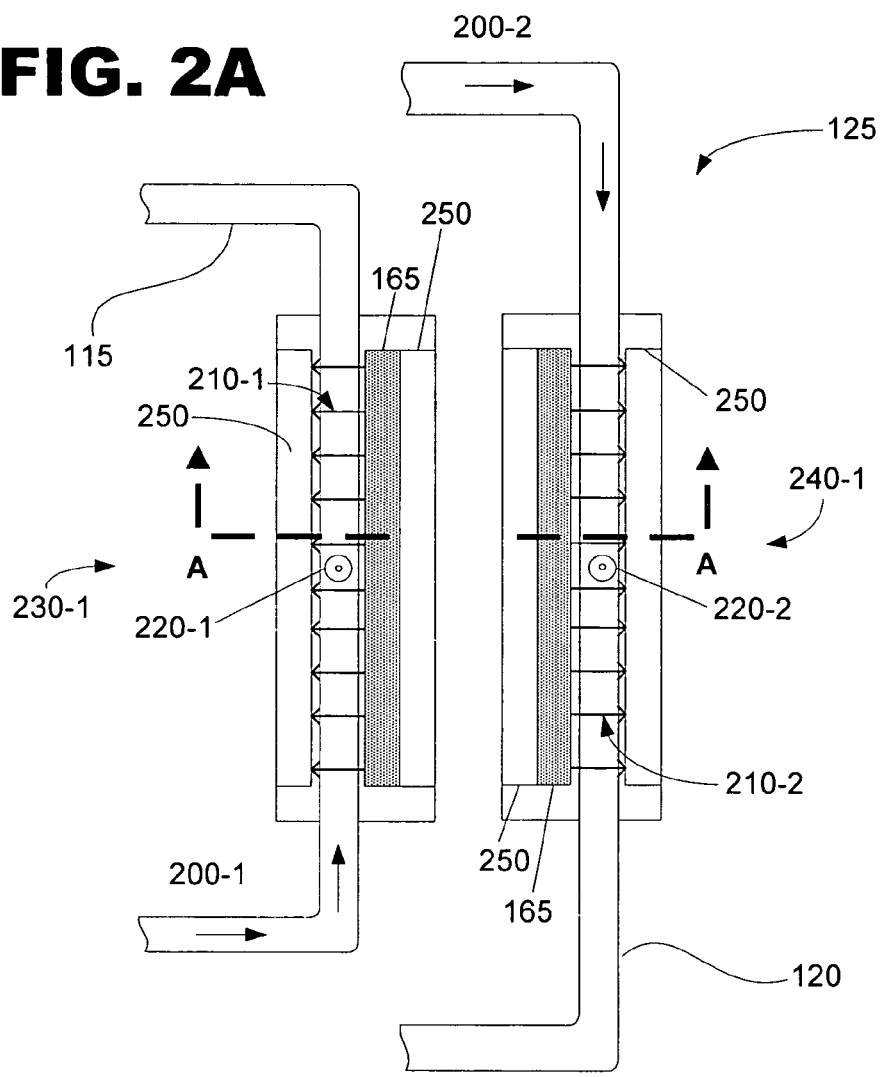
FIG. 2A illustrates a partial view of a light direction assembly showing the interaction of a magnetic field and an applied current according to one exemplary embodiment.
Figure 2B:
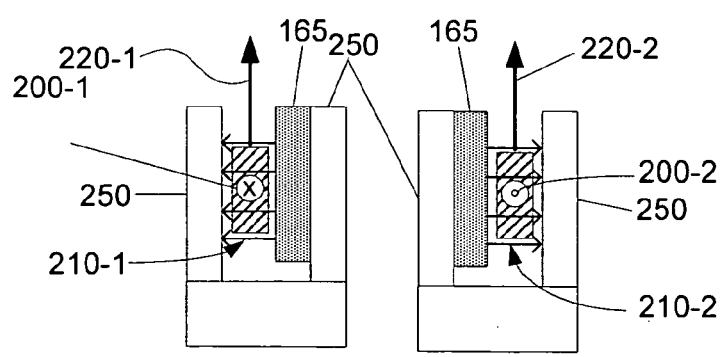
FIG. 2B illustrates a partial cross sectional view of a light direction assembly showing the interaction of a magnetic field and an applied current taken along section A—A of FIG. 2A.

FIGS. 2A–2B illustrate the currents (200-1, 200-2), magnetic fields (210-1, 210-2), and resulting magnetic forces (220-1, 220-2) caused by flowing separate currents through current coils (115, 120) that are coupled to a pole-stand assembly (125).

The pole-stand assembly (125) includes first inner and outer pole stands (230-1, 240-1). Each of the pole stands (230-1, 240-1) includes a permanent magnet (165) placed between two opposing plates (250). The two opposing plates (250) are separated from one another by the physical gap between the inner and outer pole stands (230-1, 240-1). The poles stand assembly is made of a flux conducting material to optimize the flux lines.

For ease of reference, the current coils (115, 120) are shown separated from a tip-tilt platform. It should be understood that the pole-stand assembly (125) is substantially similar to those illustrated in FIG. 1, and the description of the pole-stand assembly (125) discussed with reference to FIGS. 2A–2B may be applied to the pole-stand assembly shown in FIG. 1. Further, in the current coils (115, 120) shown, both have current flowing therein. However, in operation, the currents may be separately controlled such that only one current coil has current flowing at a given moment.

In FIG. 2A, the currents shown (200-1, 200-2) are flowing in the plane of the page, the magnetic fields (210-1, 210-2) are in the plane, and the magnetic forces (220-1, 220-2) are coming out of the page, as indicated by the two concentric circles. FIG. 2A also illustrates how current in each of the current coils (115, 120) may be controlled independently.

In FIG. 2B, the current (200-1) of the inner current coil (115) is shown flowing into the page, as indicated by the circle having an "x" therein, while magnetic field (210-1) is again shown in a direction across the page, resulting in the magnetic force (220-1) going up. Similarly, the current of the outer current coil (120) is shown flowing out of the page, as indicated by the concentric circles. The magnetic field (210-2) across the outer pole stand (240) is in a direction across the page, in the opposite direction of the magnetic field (210-1) corresponding to the inner pole stand (230-1). The resulting force (220-2) on the outer current coil (120) is also in the upward direction.

The permanent magnets (165) create the magnetic fields (210-1, 210-2) between the opposing plates (250). Segments of the current coils (115, 120) are placed between the opposing plates (250) of the inner pole stand (230) and the outer pole stand (240) respectively. Placing the segments of the current coils (115, 120) between the opposing plates places the current coils (115, 120) within the magnetic field (210). As a result, current flowing through the current coils (115, 120) flows through the magnetic fields (210-1, 220-2).

In the illustrated implementation, the currents (200-1, 200-2) are flowing substantially normal to the magnetic fields (210-1, 210-2). The interaction between the currents (200-1. 200-2) and the magnetic fields (210-1, 210-2) results in upward magnetic forces (220-1, 220-2) on the current coils (115, 120). Reversing the current flowing through the current coils (115, 120) reverses the direction of the resulting forces.

As will be discussed in more detail below, the arrangement of the magnets and their corresponding magnetic fields allows a selective application of current. Control of the inner current coil (115) results in control of tilt about the first axis (155). Similarly, selective application of current to the outer current coil (120) allows for control of tilt about the second axis (160). Accordingly, control of the application of current may be used to independently control the tilt of the tip-tilt platform (110) about the first and/or the second axis (155, 160).

As discussed, the inner pole stands (230-1, 230-2, 230-3, 230-4) are configured to allow control of tilt about the first axis (155). The permanent magnets of the first and second inner pole stands (230-1, 230-2) produce magnetic fields directed in the same direction and the third and fourth inner pole stands (230-3, 230-4) produce magnetic fields directed in the opposite direction.

Figure 3:
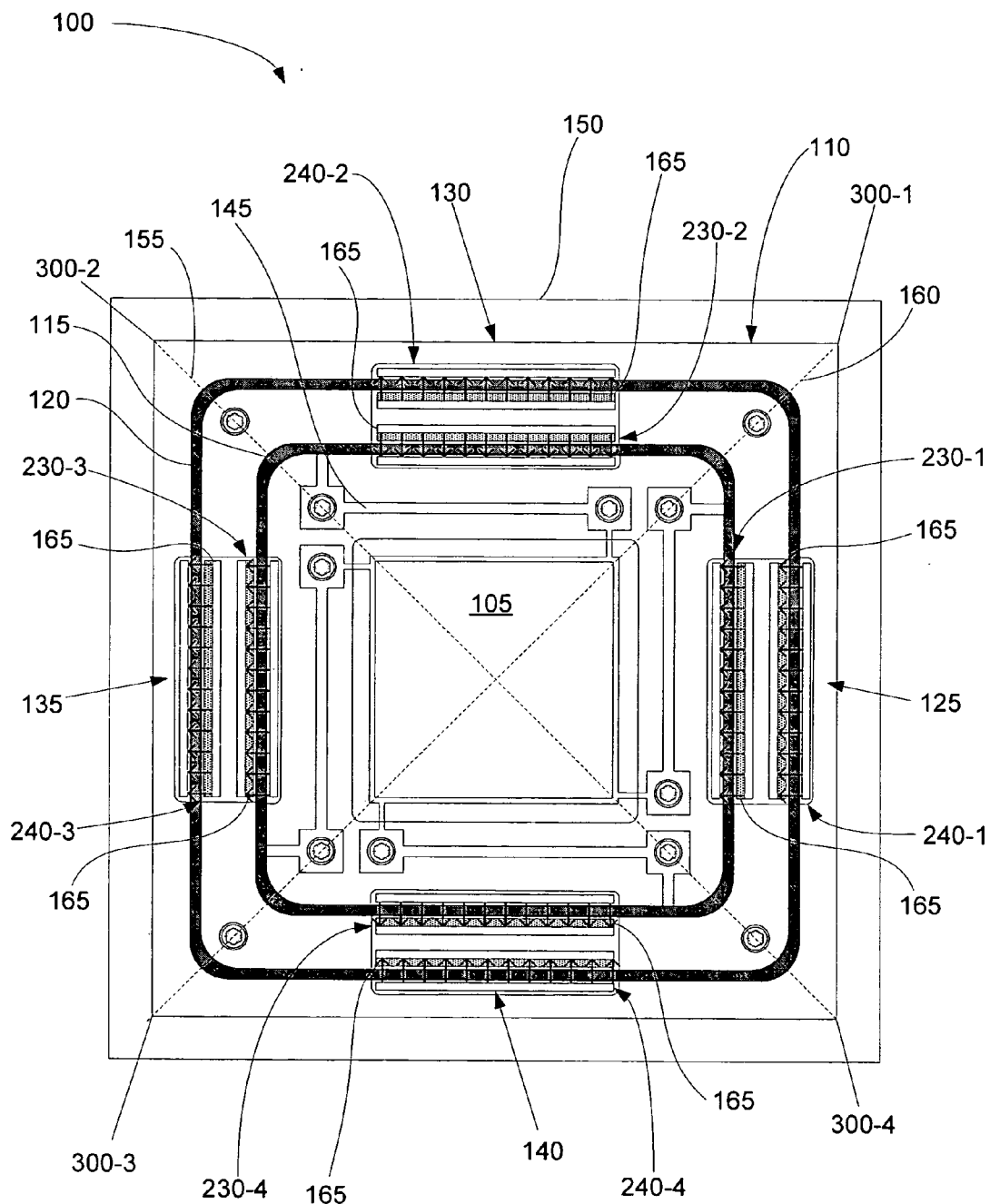
FIG. 3 illustrates a top view of a light direction assembly showing the arrangement of magnetic fields according to one exemplary embodiment.

FIG. 3 illustrates an exemplary configuration of the magnetic fields of the pole stand assemblies (125, 130, 135, 140). The permanent magnet (165) of the first inner pole stand (230-1) produces an inwardly directed magnetic field. Similarly, the permanent magnet (165) of the second inner pole stand (230-2) produces an inwardly directed magnetic field. The third and fourth inner pole stands (230-3, 2304) of the third and fourth pole stand assemblies (135, 140) produce outwardly directed magnetic fields.

The application of a counter clockwise current to the first current coil (115) across the permanent magnets (165) of the first and second inner pole stands (230-1, 230-2) produces an upward force. The application of this current to the permanent magnets (165) of the third and fourth inner pole stands (230-3, 230-4) results in a downward force. The opposing forces created by the opposing magnetic fields result in a tilt about the first axis (155). Accordingly, a first corner (300-1) of the tip tilt platform (110) is raised while a third corner (300-3) is lowered. The first axis (155) extends between second and fourth corners (300-2, 300-4) of the tip tilt platform (110).

When the current is reversed, the current flows clockwise. As a result, forces are reversed such that the third corner (300-3) of the tip tilt platform (110) is raised while the first corner (300-1) is lowered. Accordingly, switching the direction of current flow causes the tip tilt platform (110) to rotate about the first axis (155). In the case of one axis rotation, control of the current in the inner current coil (115) may be sufficient. In addition, the direction of the magnetic fields produced by the permanent magnets (165) may be reversed and still allow tilt control about the first axis (155).

Control of a current in the outer current coil (120) adds a second axis of control. The permanent magnets (165) of the second and third outer pole stands (240-2, 240-3) produce magnetic fields directed in the same direction while the first and fourth outer pole stands (240-1, 240-4) also produce magnetic fields directed in the same direction, but in a direction opposite to that produced by the second and third outer pole stands (240-2, 240-3). In FIG. 3, the second and third outer pole stands (240-2, 240-3) produce inwardly directed magnetic fields while the first and fourth outer pole stands (240-1, 2404) produce outwardly directed magnetic fields.

The application of a clockwise current to the second current coil (120) across the permanent magnets (165) of the second and third outer pole stands (240-2, 240-3) produces an upward force. This current flowing past the permanent magnets (165) of the first and fourth inner pole stands (240-1, 2404) results in a downward force. The opposing forces created by the opposing magnetic fields result in a tilt about the second axis (160). Accordingly, the first corner (300-1) of the tip tilt platform (110) is raised while the fourth corner (300-4) is lowered. When the current is reversed, the direction of the force, and hence the orientation of the tilt, is also reversed.

As will be discussed in more detail below, selective and independent control of the current in the inner and outer current coils (115, 120) allows the light direction assembly (100) to increase the perceived image quality of an image projected therethrough.

Exemplary Implementation and Operation

Figure 4A:
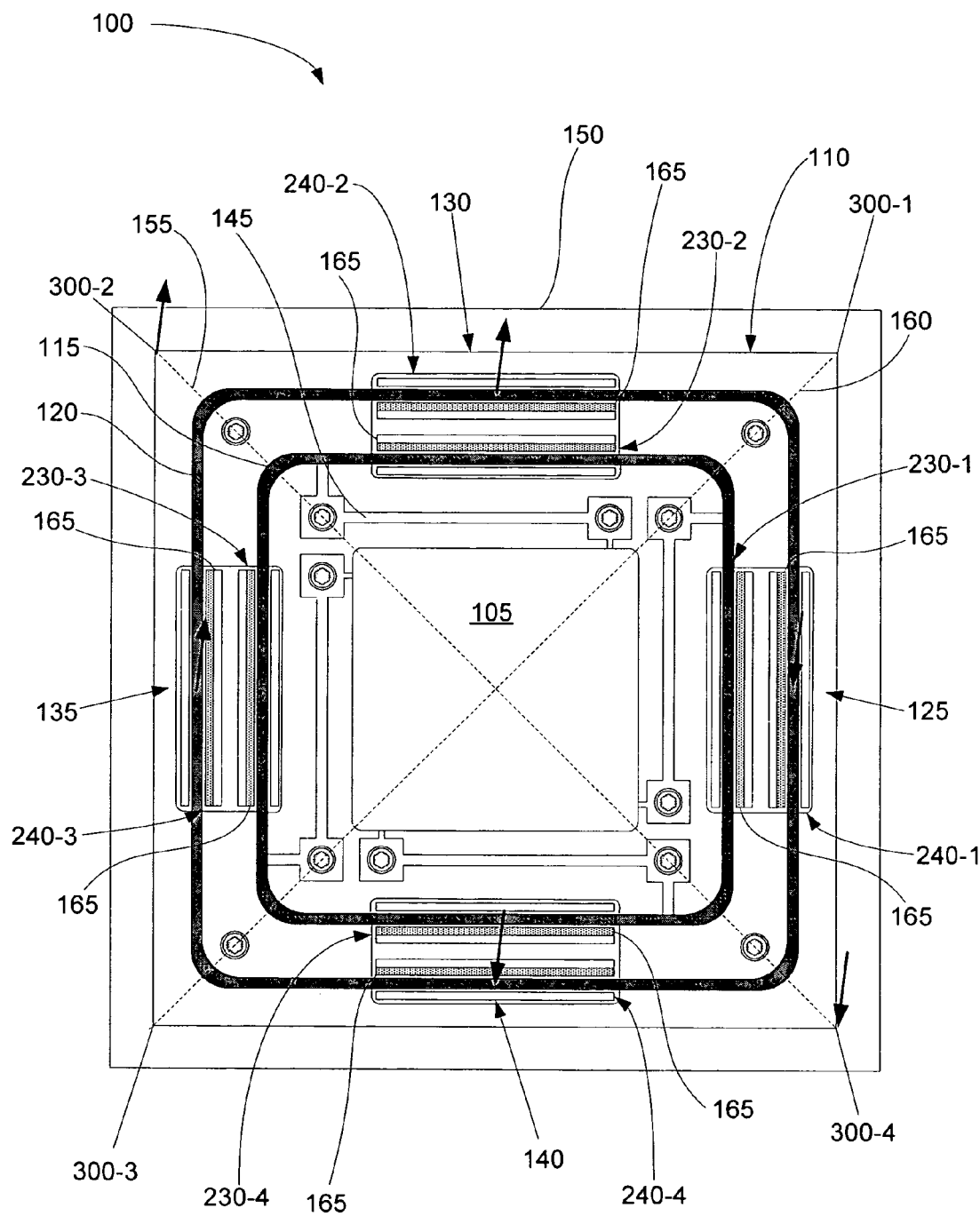
FIG. 4A illustrates a light direction assembly in a first tilt position according to one exemplary embodiment.

FIG. 4A illustrates the light direction assembly (100) in a first position. In this position, the second corner (300-2) of the tip-tilt platform (110) is raised. As previously discussed, the second corner (300-2) is raised when a current is passed in a counter clockwise direction through the outer current coil (120). No current is applied to the inner coil (115) at this moment. The clockwise current results in upward magnetic forces on the outer current coil (120) in the second and third outer pole stands (240-2, 240-3) and downward magnetic forces on the outer current coil (120) in the first and fourth outer pole stands (240-1, 240-4). These opposing forces cause the tip-tilt platform (110) to rotate about the second axis (160). As previously discussed, the motion of the tip-tilt platform (110) in response to the magnetic forces is countered by a biasing force applied by the biasing springs (145). These biasing forces allow the tip-tilt platform (110) to move through an infinite number of positions. For ease of reference, four representative positions will be discussed to show the movement of the tip-tilt platform (110).

Figure 4B:
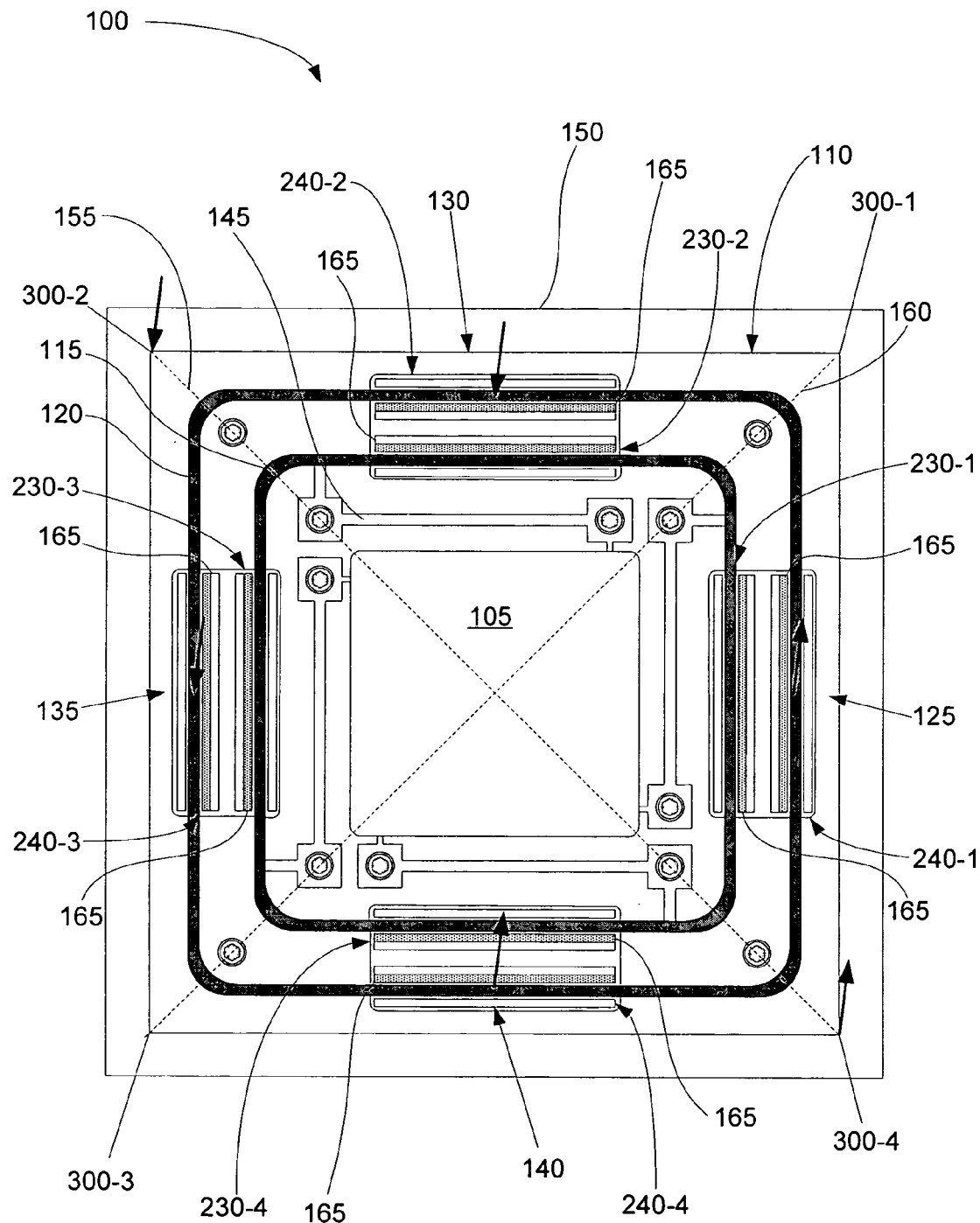
FIG. 4B illustrates a light direction assembly in a second tilt position according to one exemplary embodiment.

FIG. 4B illustrates the light direction assembly (100) in a second position. In the second position, the fourth corner (3004) is raised while the second corner (300-2) is lowered. The tip-tilt platform (110) is placed in the second position by switching the direction of the current flowing in the outer current coil (120) from clockwise to counter clockwise. Accordingly, by selectively applying and reversing the current flowing in the outer current coil (120), the tip-tilt platform (110) may be rotated or tilted about the second axis (160) between the first and second position.

Figure 4C:
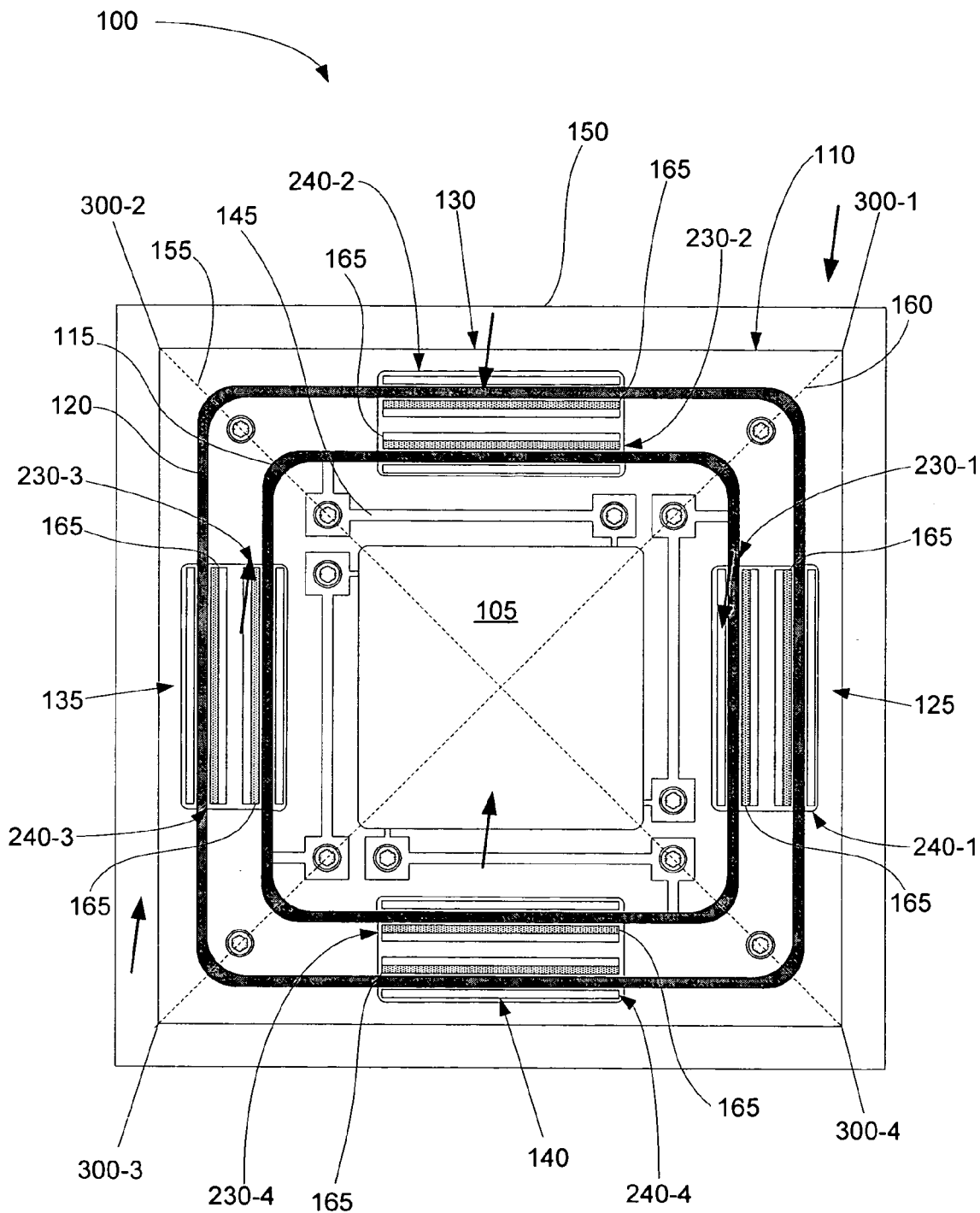
FIG. 4C illustrates a light direction assembly in a third tilt position according to one exemplary embodiment.

FIG. 4C illustrates the light direction assembly (100) in a third position. In the third position, the third corner (300-3) is raised while the first corner (300-1) is lowered. This is accomplished by flowing a clockwise current through the inner current coil (115). As the current flows past the inner current coil (115), it causes an upward force to be applied to the coil at the third and fourth inner pole stands (230-3, 230-4) and a downward force to be applied at the first and second inner pole stands (230-1, 230-2) as previously discussed.

Figure 4D:
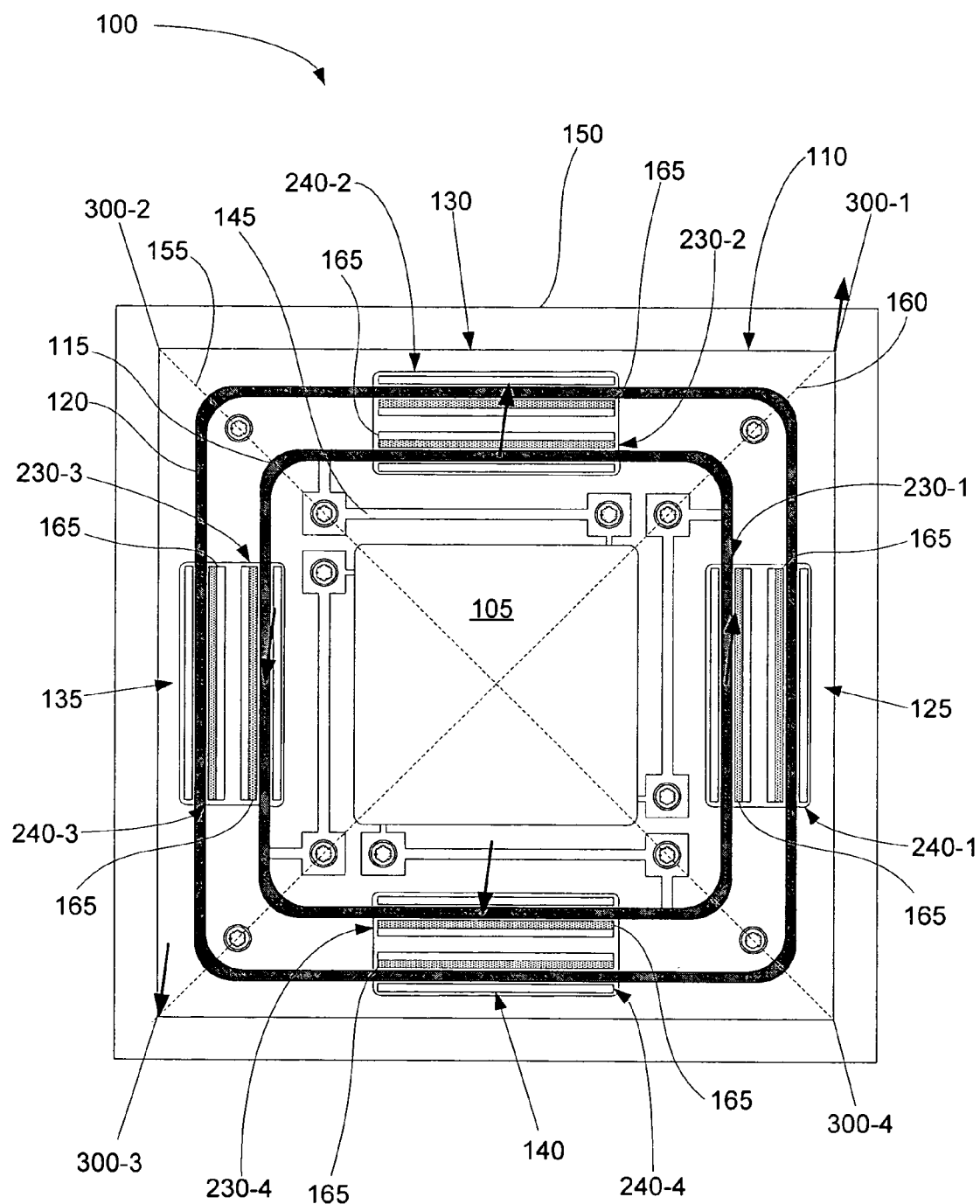
FIG. 4D illustrates a light direction assembly in a fourth position according to one exemplary embodiment.

FIG. 4D illustrates the light direction assembly in a fourth position. The light direction assembly (100) is placed in the fourth position (100) by switching the current from a clockwise direction as applied to place the light direction assembly (100) in the third position, to a counterclockwise current direction flow. Switching the direction of the current flow reverses the direction of the applied magnetic force. Accordingly, switching the direction of the current flow applied to the inner coil (115) rotates or tilts the tip-tilt platform about the first axis (155).

From the fourth position, illustrated in FIG. 4D, the light direction assembly can be moved again to the first position illustrated in FIG. 4A. By moving the light directing assembly (100) through the four illustrated positions at sufficient speed, the light directing assembly is able to improve the perceived quality of an image projected from the light directing assembly.

Figure 5:
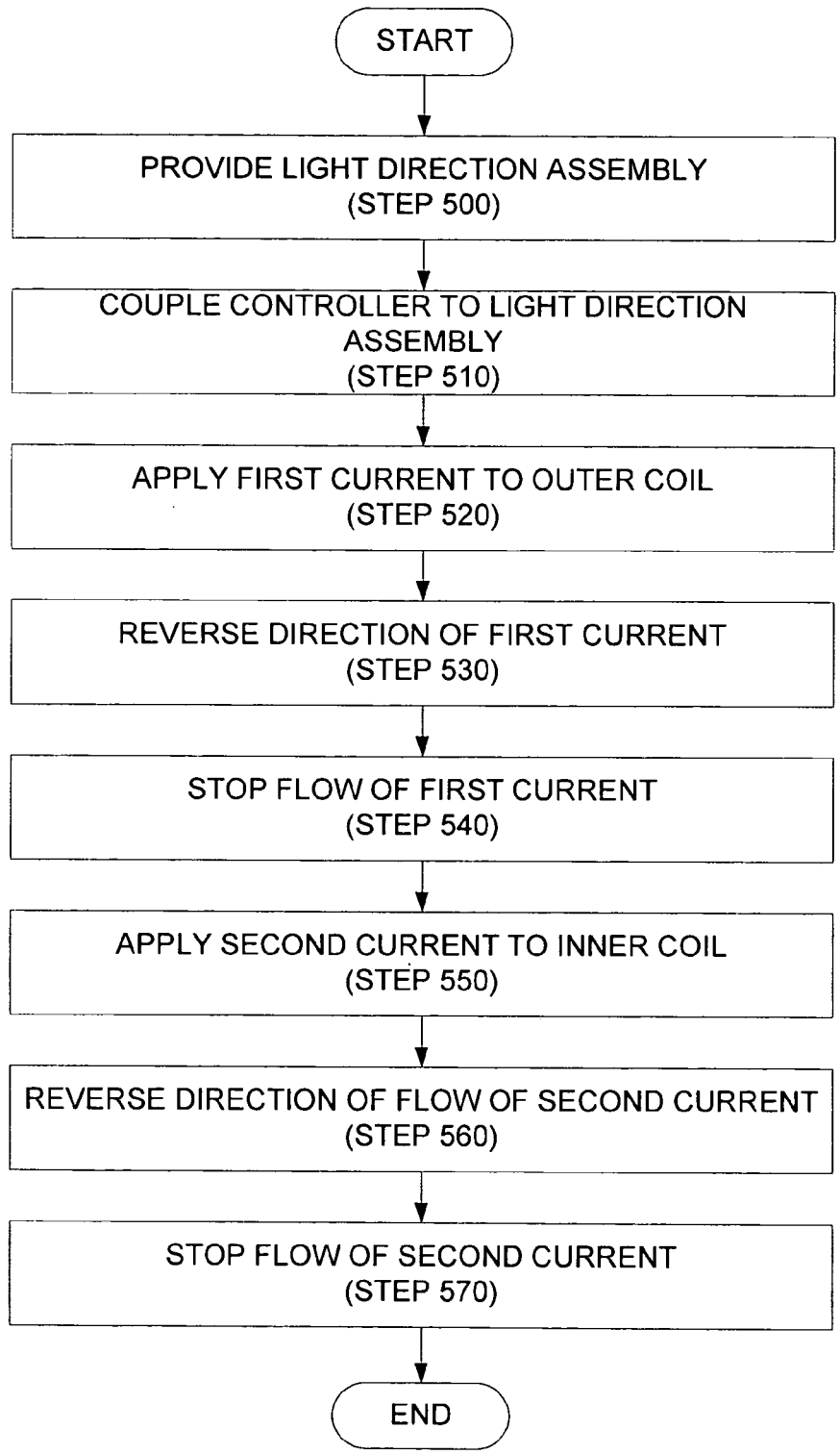
FIG. 5 illustrates a method of using a light direction assembly according to one exemplary embodiment.

FIG. 5 is a flowchart illustrating a method of using a light direction assembly. The method begins by providing a light direction assembly (step 500). The light direction assembly includes a base having a plurality of pole-stand assemblies coupled to a base and a light directing member and inner and outer coils as previously described.

The next step is to couple the light direction assembly to a controller (step 510). The controller is configured to independently control current flowing through the inner and outer coils. This control includes controlling the magnitude and direction the current flows.

The controller also directs a projector to project an image to the light direction assembly (step 520). The image projected onto the light projection assembly may either be reflected or diffracted by the light direction member to steer the image onto a projection surface. The projected image is made up of an array of individual pixels. The light direction assembly moves the projected image a half pixel distance at a time, as will be described in more detail below.

The controller begins directing light by applying a first current to the outer coil (step 520). Application of the first current causes the tip-tilt platform to tilt or rotate about an axis to move the tip-tilt platform to a first position. The current direction may be in a counter clockwise direction, to raise a second corner, as shown in FIG. 4A.

The controller then reverses the direction of the first current applied to the outer current coil (step 530). By reversing the direction of the current flow, the tip-tilt platform is rotated to a second position. This second position, as shown in FIG. 4B, raises the fourth corner of the tip-tilt platform.

The controller then ceases to apply the first current (step 540) and applies a second current to the inner current coil (step 550). The current applied to the inner coil may be applied in a clockwise direction to move the tip-tilt platform to a third position, as shown in FIG. 4C. In FIG. 4C, a clockwise current raises a third corner.

The controller then reverses the direction of the current applied to the first current coil (step 560). Reversing the current in the inner coil causes the tip-tilt axis to move to a fourth position, as shown in FIG. 4D, in which the first corner is raised. The controller then returns the tip-tilt platform to the first position by stopping the flow of the second current (step 570) and applying the first current to the outer current coil (step 520).

As described, the controller drives the tip-tilt platform through the first, second, third, and fourth positions. These positions correspond to moving the projected image a half pixel distance between each position. A half pixel distance is half the size of a typical pixel of the projected image. For example, the distance between the first position and the second position corresponds to a half pixel distance. Similarly, the distance between the second and third, the third and fourth, and the fourth and first positions corresponds to a half pixel distance.

By constantly moving the image by a half pixel distance in the pattern described above at a rate that is less fast than the flicker rate of the eye, the perceived quality of the image projected is effectively doubled. For example, the current may be applied and reversed such that the light direction assembly cycles, or moves between the first, second, third, and fourth positions at between 120–240 cycles per second. This technique is known as wobulation and is described in commonly assigned patent application entitled "Image Display System and Method," Ser. No. 10/213,555 filed Aug. 7, 2002, which is hereby incorporated by reference in its entirety.

In the illustrated process, the current flows are stopped before another current is applied. The current flow may be stopped gradually to allow a smooth transition between positions. Further, the current flows may be held at an intermediate position. In other words, the currents may be applied simultaneously and held at that voltage. As a result, the tip-tilt platform may be moved to an infinite number of positions.

Figure 6:
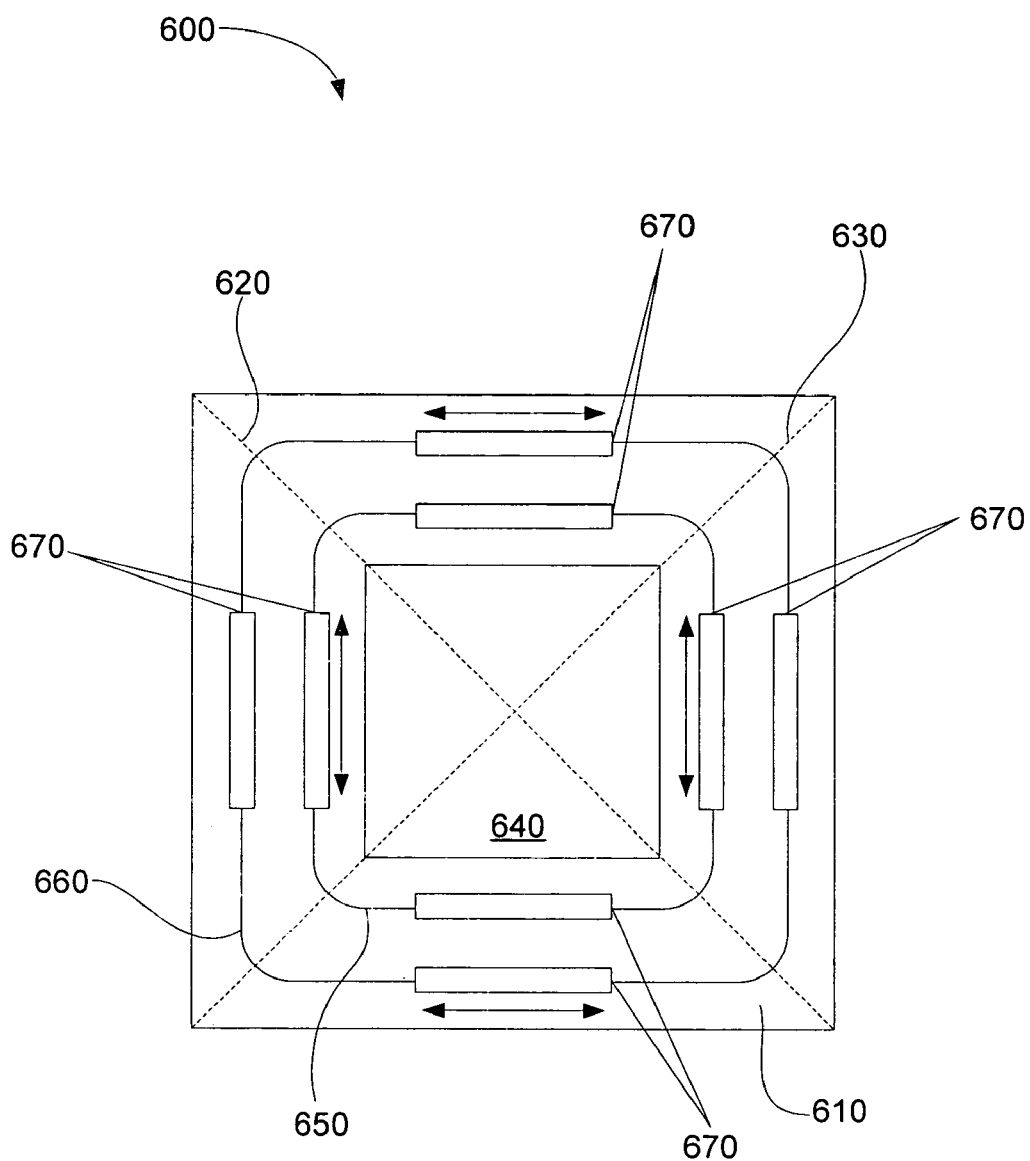
FIG. 6 illustrates a schematic view of a light direction assembly according to one exemplary embodiment.

FIG. 6 is a schematic diagram of light direction assembly (600). The light direction assembly includes a tip-tilt platform (610) having first and second axes (620, 630) and a light direction member (640) and first and second current coils (650, 660) coupled thereto. The light direction assembly (600) also includes a plurality of pole stand assemblies (670) coupled to each of the first and second current coils (650, 660). Each of the pole stand assemblies (670) includes at least one magnet.

The light direction assembly (600) is configured such that current flowing in the first current coil (650) flows past one group of pole stand assemblies. As the current flows past the magnets, a force is exerted on the first current coil (650), and consequently the tip-tilt platform (610). Accordingly, controlling the direction and magnitude of the current flowing through the first current coil (650) controls the force exerted on the tip tilt platform (610) by the magnets. The pole stand assemblies (670) are located such that the force exerted due to current in the first current coil (650) causes the tip-tilt platform (610) to rotate about the first axis. Similarly, pole stand assemblies (670) are coupled to the second current coil (660) such that the force exerted due to current in the second current coil (660) causes the tip-tilt platform (610) to rotate about the second axis (630). Accordingly, control of two currents may control the rotation of the tip-tilt platform (610).

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A light direction assembly, comprising:
   tip-tilt platform having a first and second axes and having a light direction member coupled thereto;
   first and second current coils coupled to said platform; and
   a plurality of pole stand assemblies coupled to said first and second current coils, each pole stand assembly including a plurality of magnets disposed between said first and second current coils;
   wherein said magnets are configured to selectively tilt said tip-tilt platform with respect to first and second axes in response to first and second currents flowing through said first and second current coils.

2. The assembly of claim 1, wherein said first and second current coils are concentrically coupled to said tip-tilt platform.

3. The assembly of claim 1, wherein said light direction member comprises a reflecting light direction member.

4. A light direction assembly, comprising:
   tip-tilt platform having a first and second axes and having a light direction member coupled thereto;
   first and second current coils coupled to said platform; and
   a plurality of pole stand assemblies coupled to said first and second current coils and including a plurality of magnets;
   wherein said magnets are configured to selectively tilt said tip-tilt platform with respect to first and second axes in response to first and second currents flowing through said first and second current coils;
   wherein said light direction member comprises a refracting light direction member.

5. The assembly of claim 1, further comprising a base member wherein said post stand assemblies are coupled to said base and said tip-tilt platform is configured to move with respect to said base.

6. A light direction assembly comprising:
   tip-tilt platform having a first and second axes and having a light direction member coupled thereto;

first and second current coils coupled to said platform; and a plurality of pole stand assemblies coupled to said first and second current coils and including a plurality of magnets;

wherein said magnets are configured to selectively tilt said tip-tilt platform with respect to first and second axes in response to first and second currents flowing through said first and second current coils;

wherein said pole stand assemblies are first, second, third, and fourth pole stand assemblies each having first, second, third, and fourth inner and outer pole stands.

7. The assembly of claim 6, wherein said magnets are coupled to each of said inner and outer pole stands.

8. The assembly of claim 7, wherein control of said first current coil is sufficient to control rotation of said tip-tilt platform about said first axis.

9. The assembly of claim 7, wherein said magnets of said first and second inner pole stands produce a magnet field directed in a first direction and said third and fourth inner pole stands produce a magnetic field directed in a direction opposite to said first direction.

10. The assembly of claim 9, wherein said first direction is an inward direction and said opposite direction is an outward direction with respect to a central portion of said assembly.

11. The assembly of claim 6, wherein control of said second current coil is sufficient to control rotation of said tip-tilt platform about said second axis.

12. The assembly of claim 11, wherein said magnets of said second and third inner pole stands produce a magnet field directed in a first direction and said first and fourth inner pole stands produce a magnetic field directed in a direction opposite to said first direction.

13. The assembly of claim 12, wherein said first direction comprises an inward direction and said opposite direction comprises an outward direction with respect to a central portion of said assembly.

14. The assembly of claim 1, further comprising a spring assembly configured to urge said tip-tilt platform toward a biased position.

15. The assembly of claim 14, wherein said spring assembly comprises a plurality of cantilever springs.

16. A light direction system, comprising:
a light direction assembly including a tip-tilt platform having an inner and an outer current coil coupled thereto;

a base having a plurality of pole stand assemblies, wherein each pole stand assembly includes an inner and an outer pole stand each having a magnet coupled thereto wherein said inner pole stands are coupled to said inner coil and said outer pole stands are coupled to said outer current coils; and a controller configured to apply a first current to said inner coil to control a rotation of said tip-tilt platform about a first axis and to apply a second current to said outer coil to control a rotation of said tip-tilt platform about a second axis.

17. The assembly of claim 16, wherein said pole stand assemblies are first, second, third and fourth pole stand assemblies each having first, second, third, and fourth inner and outer pole stands.

18. The assembly of claim 16, wherein said tip-tilt platform includes first, second, third and fourth corners and said controller is configured to move said tip-tilt platform between a plurality of positions.

19. The assembly of claim 18, wherein said plurality of positions comprises a first position, wherein said second corner is raised with respect to said base, a second position, wherein said fourth corner is raised with respect to said base, a third position wherein said third corner is raised with respect to said base, and a fourth position wherein said first corner is raised with respect to said base.

20. The assembly of claim 19, wherein said controller is configured to move said tip-tilt platform between said first, second, third, and fourth positions at a rate of between 120 and 240 cycles per second.

21. A method of controlling rotation of a tip-tilt platform, comprising:
controlling a first current in a first current coil to control rotation of said tip-tilt platform about a first axis; and controlling a second current in a second current coil to control rotation of said tip-tilt platform about a second axis wherein said second axis is disposed at an angle with respect to said first axis; and selectively generating said rotation of said tip-tilt platform with said first and second currents by passing said first and second coils through a plurality of differently-oriented magnetic fields generated by pairs of magnets disposed adjacent said coils.

22. The method of claim 21, wherein controlling said first current comprises
applying a first current to a first current coil to cause rotation of said tip-tilt platform in a first direction about said first axis and reversing a direction of said first current to cause said tip-tilt platform to rotate in a second direction which is opposite of said first direction, and wherein controlling said second current comprises applying said second current to a second current coil to cause rotation of said tip-tilt platform in a third direction about a second axis; and reversing a direction of said second current to cause said tip-tilt platform to rotate in a fourth direction which is opposite of said third direction.

23. The method of claim 22, wherein said currents are applied and reversed at a rate of at least 30 hertz.

24. The method of claim 23, wherein said rotation steps occur at an interval less than a flicker rate of a human eye.

25. The method of claim 22, further comprising applying a biasing force to said tip-tilt platform to return said tip-tilt platform to a biased position.

26. A light direction system, comprising:
a means for controlling a first current to control rotation of said light direction member about a first axis;

a means for controlling a second current to control rotation of said light direction member about a second axis; and means for selectively generating said rotation of said light direction member with said first and second currents by passing first and second coils carrying said first and second currents through a plurality of differently-oriented magnetic fields generated by pairs of magnets disposed adjacent said coils.

27. The system of claim 26, further comprising means for restoring said light direction member to an unbiased position.

28. The system of claim 26, further comprising means for controlling the rotation of said light direction means about said first and second axes.

29. A method of operating a light direction system including a tip-tilt platform supporting a light direction member and having an inner and an outer current coil coupled thereto; and a base having a plurality of pole stand assemblies, wherein each pole stand assembly includes an inner and an outer pole stand each having a magnet coupled thereto wherein said inner pole stands are coupled to said inner coil and said outer pole stands are coupled to said outer coil;

said method comprising:

applying a first current to said inner coil with a controller to control a rotation of said tip-tilt platform about a first axis and applying a second current to said outer coil with said controller to control a rotation of said tip-tilt platform about a second axis.

30. The method of claim 29, wherein said tip-tilt platform includes first, second, third and fourth corners, said method comprising moving said corners of said tip-tilt platform to place said platform in a plurality of positions.

31. The method of claim 30, wherein said plurality of positions comprises a first position, wherein said second corner is raised with respect to said base, a second position, wherein said fourth corner is raised with respect to said base, a third position wherein said third corner is raised with respect to said base, and a fourth position wherein said first corner is raised with respect to said base.

32. The method of claim 31, further comprising moving said tip-tilt platform between said first, second, third, and fourth positions at a rate of between 120 and 240 cycles per second.

33. The assembly of claim 1, wherein said coils are concentric and a pair of said pole stand assemblies are located on opposite sides of said coils and comprise magnets that all direct a magnetic field in a single direction.

34. The assembly of claim 33, wherein:

a second pair of said pole stand assemblies are also located on opposite sides of said coils;

a first pole stand assembly of said second pair comprises a pair of magnets that each direct a magnetic field toward each other; and a second pole stand assembly of said second pair comprises a pair of magnets that each direct a magnetic field away from the other:

said plurality of pole stand assemblies comprises four pole stand assemblies.

35. The assembly of claim 4, wherein said coils are concentric and a pair of said pole stand assemblies are located on opposite sides of said coils and comprise magnets that all direct a magnetic field in a single direction.

36. The assembly of claim 35, wherein:

a second pair of said pole stand assemblies are also located on opposite sides of said coils;

a first pole stand assembly of said second pair comprises a pair of magnets that each direct a magnetic field toward each other; and a second pole stand assembly of said second pair comprises a pair of magnets that each direct a magnetic field away from the other;

said plurality of pole stand assemblies comprises four pole stand assemblies.

37. The assembly of claim 4, wherein each of said pole stand assemblies comprises a plurality of magnets disposed between said first and second current coils.

* * * * *